Nov. 13, 1951 G. T. BAKER 2,575,087

ELECTRONIC COUNTING ARRANGEMENT

Filed July 13, 1948 4 Sheets-Sheet 1

George Thomas Baker Inventor

By

Young, Emery & Thompson Attorneys

George Thomas Baker Inventor
By
Young, Emery & Thompson Attorneys

ELECTRONIC COUNTING ARRANGEMENT

Filed July 13, 1948 4 Sheets-Sheet 3

George Thomas Baker Inventor
By
Young Emery & Thompson Attorneys

ELECTRONIC COUNTING ARRANGEMENT

George Thomas Baker Inventor
By
Young, Emery & Thompson Attorneys

Patented Nov. 13, 1951

2,575,087

UNITED STATES PATENT OFFICE 2,575,087

ELECTRONIC COUNTING ARRANGEMENT

George Thomas Baker, Liverpool, England, assignor to Automatic Telephone & Electric Company Limited, Liverpool, England, a British company Application July 13, 1948, Serial No. 38,360
In Great Britain September 2, 1947

5 Claims. (Cl. 175—183)

Figure 1:
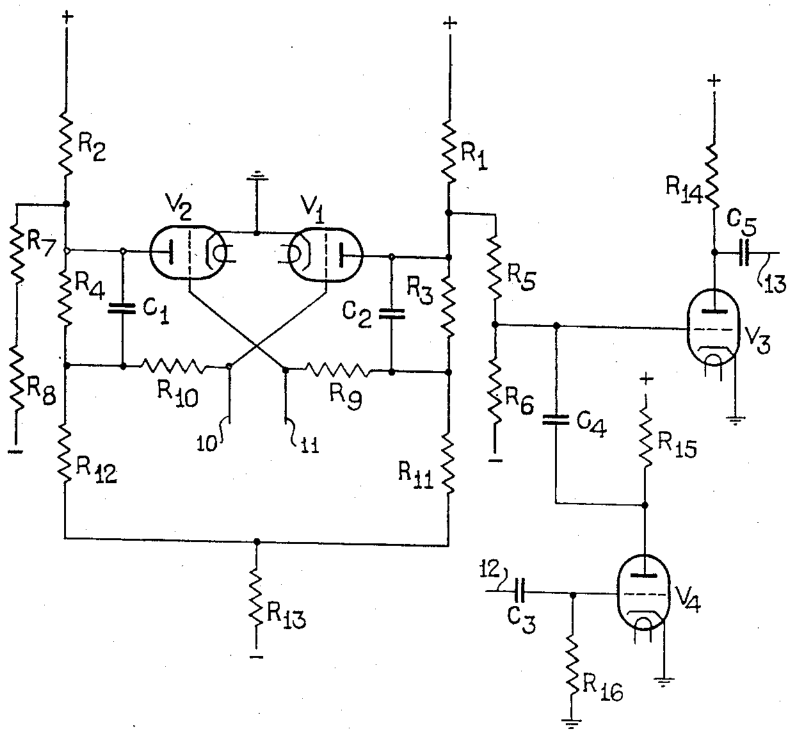

The present invention relates to electronic counting circuits and is more particularly concerned with control arrangements for the counting circuits.

Electronic counting circuits may be used in certain applications for either of two purposes. They may be used for measuring the time between two events by counting the number of impulses delivered to the circuit between the two events from an accurate source of impulses or they may be used to deliver a predetermined number of impulses from a source to a further circuit, the predetermined number being variable under manual or automatic control.

In each of these applications it is necessary to associate some form of control arrangement with the counting circuit which in the first application mentioned above serves to complete a path between the impulse source and the counting circuit on the occurrence of the first event and serves to open the path on the occurrence of the second event. In the second application the path is completed at an arbitrary time and opened after a predetermined number of impulses have been delivered to the counting circuit. A control arrangement of this type is well known and is often termed a "gate" or "gate circuit."

It is the main object of the present invention to provide an improved control or gate circuit for an electronic counting circuit which will operate with equal facility with any type of counter.

According to a feature of the invention in a circuit arrangement for completing a path between a source of impulses and an electronic counting arrangement on the occurrence of one event and for opening said path on the occurrence of a second event, the output from said source is applied to a thermionic valve to which a blocking potential is normally applied from a trigger circuit having two stable conditions of equilibrium, said trigger circuit being responsive to an impulse on the occurrence of one event to remove said blocking potential to complete said path and to a further impulse on the occurrence of a second event to replace said blocking potential to open said path.

According to a further feature of the invention in a circuit arrangement for completing a path between a source of impulses and an electronic counting arrangement on the occurrence of one event and for opening said path on the occurrence of a second event, the output from said source and a control potential are applied to an electrode or electrodes of a thermionic valve in such a manner that the control voltage normally biases the valve well beyond cut-off and on the occurrence of one event the control potential is changed so that the bias approaches the cut-off voltage and positive-going impulses from the source pass through the valve and thence to the counting arrangement while on the occurrence of a second event the control potential reverts to substantially its normal value and the valve is again biased well beyond cut-off.

One of the major problems met with in the control of a counting circuit to deliver a predetermined number of impulses is the necessity of resetting the counting circuit to zero after each transmission. In applications involving a very large number of counting circuits resetting necessitates a larger number of additional control circuits.

According to a further feature of the invention, resetting is avoided by associating two gates with a counting circuit and by allowing the counting circuit to pass through a complete cycle, the operation of the first gate serving to initiate an operative cycle of the counting circuit while due to a selective connection between the counting circuit and the second gate the latter controls the point in the cycle at which impulses are delivered to the output.

In the application of the gate to the control of a counting circuit to time the duration between two events, each event produces an impulse, that due to the first event serving to open the gate whereupon impulses from an accurately timed source are passed to the counting circuit while that due to the second event serves to close the gate and the application of further impulses to the counting circuit is prevented.

It will be seen that the gate of the present invention has a number of advantages compared with prior gating arrangements. Usually in these prior arrangements the gate valve has at least two control electrodes, the impulses from the impulse source being applied to the control grid while the gating impulse is applied, for instance, to the screen grid. With this arrangement the gating impulse has to be applied to the screen grid for the total time that the gate is required to be closed and this arrangement thus involves the provision of suitable means for generating a variable duration square wave. Using the "start-stop" principle as in the present invention avoids this necessity since the two control impulses may be derived either from the work circuit or at least one may be obtained from the counting circuit while the other is derived from a manual operation such as the closing of a switch or the like.

It will also be seen that by arranging that the grid bias of the gate valve varies in the two conditions from a value well beyond cut-off to approximately the cut-off point, the presence of negative-going impulses in the output from the impulse source is without effect on the gate valve i. e. the circuit is truly unidirectional.

The operative range of the arrangement when used to time the duration between two events is arranged, according to a further feature of the invention, to be variable by the provision of a plurality of impulse sources which deliver impulses at different predetermined and accurately adjusted rates, the appropriate source being selected by suitable switching arrangements. In one embodiment a master oscillator in the form of a crystal-controlled multivibrator is employed. The master oscillator is not used directly but controls a chain of a plurality of multivibrators each giving an appropriate frequency division according to the range required. For instance, if the frequency of the master oscillator is 100 kc. per second and three multivibrators are used each giving a ten to one frequency division, time units of 0.1 millisec., 1.0 millisec. and 10 millisec. will be obtained.

One example of the use of the gate circuit as a timing arrangement is in connection with the determination of the operate, release and transit times of the contact springs of electromagnetic relays of the type used in telephone systems, remote control systems and like selective signalling arrangements. Previous timing devices for this purpose have been extremely cumbersome and the operation takes a considerable time. According to a further feature of the invention a gate circuit in conjunction with suitable counting circuits is associated with switching arrangements which complete control circuits to the gate circuit in such a manner that the various operations of the contacts may be timed with great rapidity and accuracy.

In one embodiment of the timing device, two leads extend to the gate circuit, the operation of which is controlled by the application or removal of a fixed potential to one or both of the leads on the occurrence of both events. For instance, the connection of earth potential to one lead serves to apply a start signal to the gate circuit while the removal of earth from the same lead gives rise to a stop signal. The connection and disconnection of earth to and from the other lead gives rise to the opposite signals. The switching device is so arranged that the appropriate start signal is given over one lead while the stop signal is given over the same lead or over the other lead according to the type of test being made.

The invention will be better understood from the following description taken in conjunction with the accompanying drawings comprising Figs. 1 to 10.

In the drawings

Figure 2:
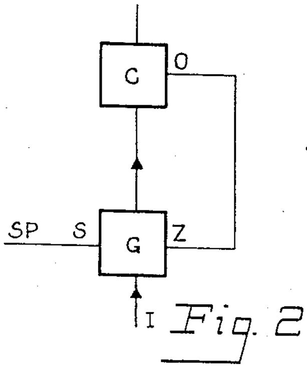
Figure 3:
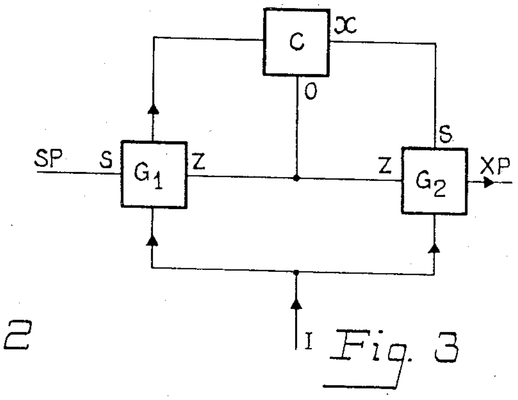
Figure 4:
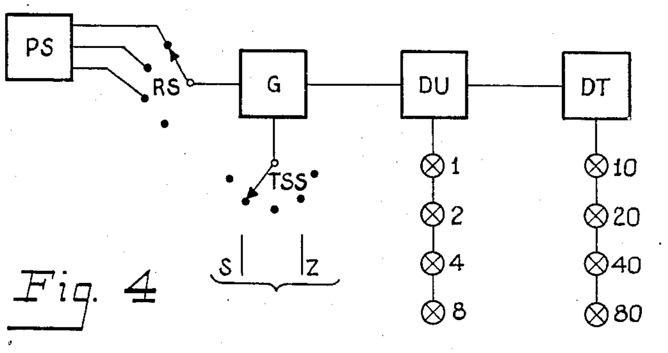
Figure 5:
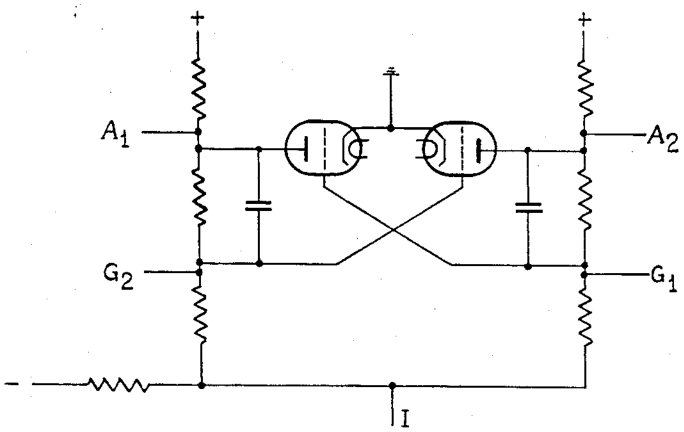
Figure 6:
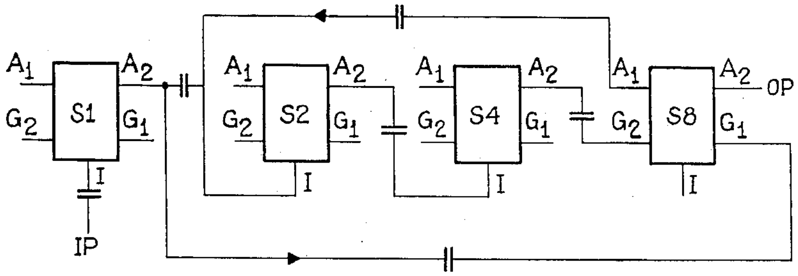
Figure 7:
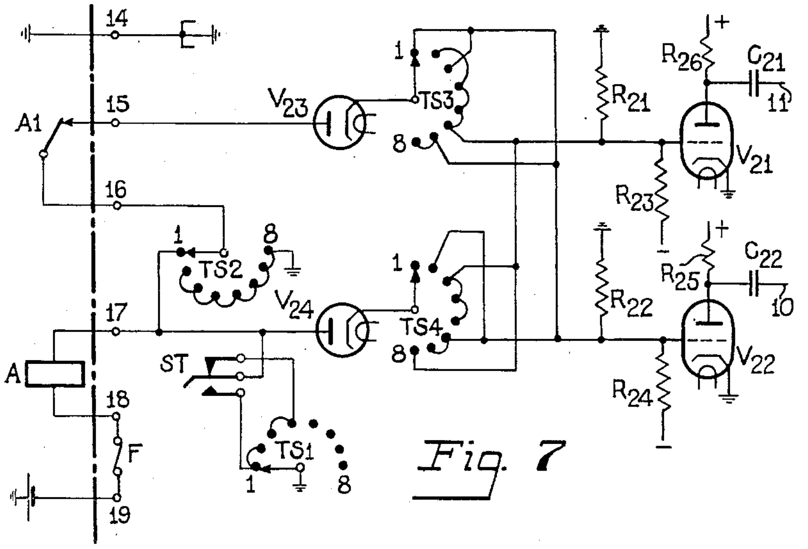
Figure 8:
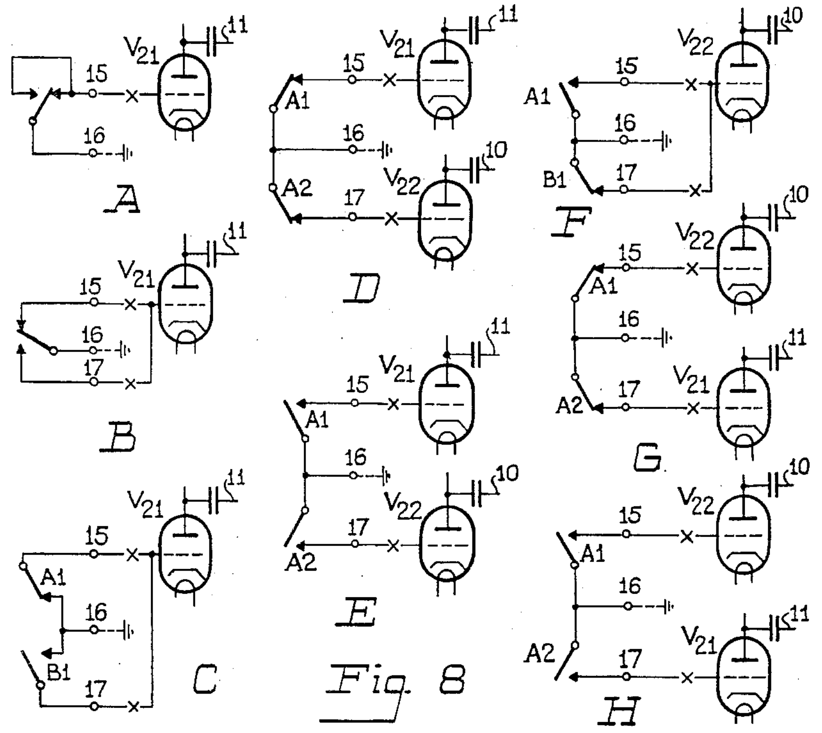
Figure 9:
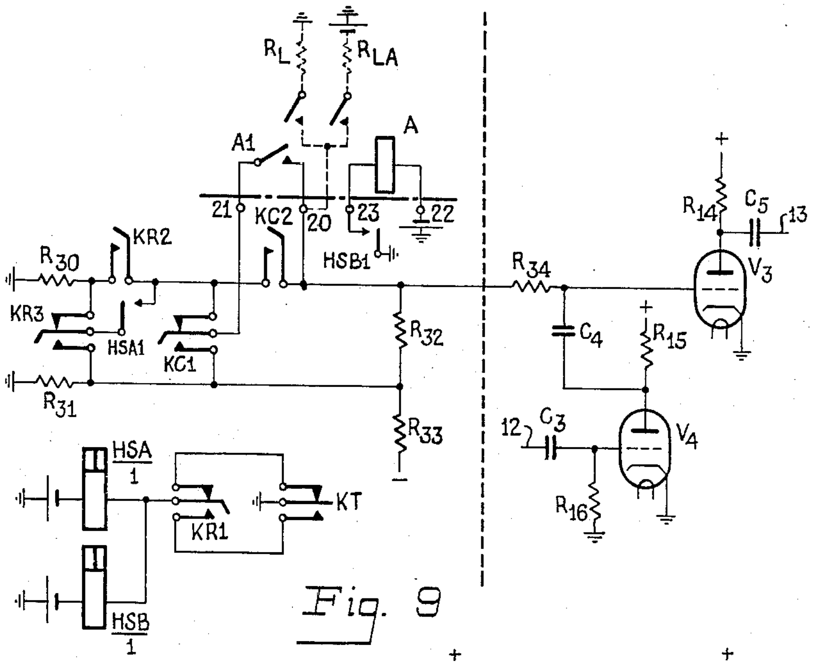
Figure 10:
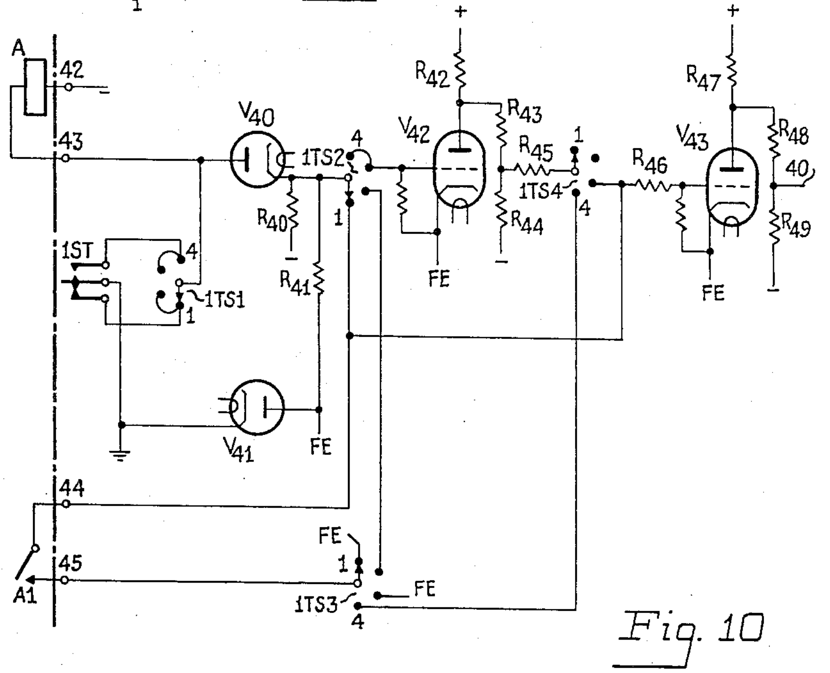

Fig. 1 shows the basic circuit of the gate,

Figs. 2 and 3 show two alternative arrangements for employing the gate in conjunction with a counting circuit, Fig. 4 shows schematically, the application of the gate and counting circuit to the timing of relay contact springs, Fig. 5 shows a scale-of-two counter as used in the timer of Fig. 4, Fig. 6 shows the manner in which four scale-of-two counters such as shown in Fig. 5 are combined to give a decade counter, Fig. 7 shows the circuit details of the contact timer, Fig. 8 shows in simplified form the method of connecting the contacts to terminals 15, 16 and 17 shown in Fig. 7 and the connections between these terminals and the valves $V_{21}$ and $V_{22}$ according to the position of the test select switch, the wipers of the switch and the diodes $V_{23}$ and $V_{24}$ of Fig. 7 being indicated only by crosses, while Figs. 9 and 10 show simplified forms of the circuit of Fig. 7.

It should be explained that all the potentials indicated on the drawings are measured with respect to earth potential which is regarded as the reference potential for the circuit. It will of course be appreciated that any other potential could be selected as a reference potential.

Referring first to Fig. 1, the valves $V_1$ and $V_2$ are arranged in a known circuit to give two conditions of stable equilibrium, the anode of each valve being resistance-coupled to the grid of the other. The control impulses are applied to leads 10 and 11 while the impulses from the impulse source are applied to lead 12. The valve $V_3$ is the gating valve, the output from which is applied over lead 13 to any suitable form of electronic counter. The normal condition of valves $V_1$ and $V_2$ is for $V_1$ to be conducting and $V_2$ to be non-conducting. In this condition the anode voltage of the valve $V_1$ is considerably below the full positive voltage available and by suitably choosing the values of resistances $R_5$ and $R_6$ it is arranged that the control grid of the valve $V_3$ is very much negative with respect to earth and the valve is thus biased well beyond the cut-off point. Impulses fed over the lead 12 are phase-reversed by the amplifying and shaping valve $V_4$ and both positive and negative-going impulses fed through condenser $C_4$ are thus without effect on the control grid and hence the impulses are prevented from passing to the output circuit. The start impulse, which will hereinafter be termed the S pulse, is applied, for instance, over lead 10 and will be negative-going, the effect of the pulse being to transpose the condition of the valves $V_1$ and $V_2$. $V_1$ now ceases to conduct and the anode potential will rise to a value which is below the full positive voltage by the voltage drop in resistance $R_1$ resulting from the current flow through resistances $R_1$, $R_5$ and $R_6$. This will cause an increase in the potential drop across resistance $R_6$ with the result that the control grid of the valve $V_3$ will become less negative. The value of the resistance $R_1$ is such that the control grid of the valve $V_3$ moves positive to such an extent that the control grid is approximately at cut-off potential. The positive-going pulses applied through condenser $C_4$ will thus pass through valve $V_3$ and via condenser $C_5$ and lead 13 to the counting circuit.

The stop pulse which will henceforth be referred to as the Z pulse is applied over lead 11 and is also negative-going to cause the condition of the valves $V_1$ and $V_2$ to be again transposed so that they revert to their original condition. The valve $V_1$ therefore becomes conducting and as a result the control grid of the valve $V_3$ is biased well beyond cut-off. It will however be understood that the start pulse might equally well be a positive-going signal applied to lead 11 while the stop pulse may be a positive-going pulse applied to lead 10. Alternatively both the start and stop pulses may be applied to one lead only, the start pulse being, for instance, a positive-going pulse applied to lead 11 while the stop pulse is a negative-going pulse applied to the same lead. It will also be understood that while the impulses from the impulse source and the control voltage are both applied to the control grid of a triode, they could by using a tetrode or pentode be applied to separate control electrodes, the impulses from the impulse source being connected to the electrode nearest the cathode.

The circuit of Fig. 2 shows, diagrammatically, one way of deriving the Z pulse from the counting circuit itself, the counting circuit being shown diagrammatically by C and the gate by G. The counting circuit is, for instance of the type in which an impulse may be derived from the counting circuit for each impulse counted. If, therefore, a connection indicated by O is taken from the anode of one of the valves of the last stage to the gate circuit G, and is connected to lead 10 shown in Fig. 1, this impulse will serve to open the gate. Thus with the arrangement of Fig. 2 the application of an S pulse to the gate G will cause the counter to pass through a complete cycle whereupon the Z pulse is fed from the counter to the gate and the latter is opened. The circuit shown in Fig. 2 of course has no great application but has been included in order to show the method of controlling the gate circuit from the counting circuit.

The arrangement shown in Fig. 3 may be employed for controlling the counting circuit to deliver the predetermined number of impulses. It will be understood that in order to avoid the problems of resetting the counting circuit it is preferable that the counter when once started should pass through a complete cycle irrespective of the number of impulses which are to be delivered. By using a second gate circuit and by employing a selective connection between the anodes of the counting circuit to the second gate circuit this may be easily arranged. The selective connection is represented by $x$ and in operation a start pulse closes the gate $G_1$ so that impulses from the impulse source are fed over lead I through the gate $G_1$ and are counted by the counting circuit C. When a number of impulses have been counted which is complementary to the number required to be delivered, an impulse is fed from the counting circuit to the gate $G_2$ and this forms the S pulse for the gate $G_2$ which is thereupon closed. Impulses from the impulse source are now fed over the gate $G_2$ to some subsequent circuit and when the counter has counted out the required number of impulses i. e. when it has completed a cycle of operation it transmits the Z pulse to both the gates $G_1$ and $G_2$.

In order to describe an application of the invention to a timing arrangement for relay contacts, reference will be made to Fig. 4 which shows schematically, a suitable arrangement for this purpose. The pulse source PS provides a number of standard frequencies corresponding to different time ranges, the desired frequency being selected by the range switch RS and passed on to the gate stage G. The test select switch TSS is arranged to condition the circuit for the required test by altering the connections between the equipment under test and the gate stage. The number of pulses which pass through the gate stage is counted on two decade counters DU and DT and the result is indicated on the neon tubes 1, 2, 4, 8, 10, 20, 40 and 80, four being associated with each decade counter. The operation is controlled from a start key (not shown in Fig. 4) the equipment being automatically returned to normal on the restoration of this key.

Three standard frequencies are obtained from the pulse source giving time units of 0.1 millisecond, 1 millisecond and 10 milliseconds. The range switch is, however, provided with a 4th position which connects to an external terminal to enable the instrument to be used as a counter.

The decade counters may be of any conventional type but for this application an arrangement of four binary stages is preferred to a ring type counter. The circuit of one binary stage is shown in Fig. 5 from which it will be seen that this circuit is itself well known, athough the feed back arrangements between the various stages as shown in Fig. 6 differ from previous arrangements. The output from the first stage is fed forward to the last stage while a feed back path extends from the last stage to the second stage. The feed forward path is ineffective on the last stage until the count of eight whereupon the last stage is immediately restored and the feed back to the second stage prevents this being operated.

Referring now to Fig. 7, this shows the control circuits which in conjunction with the circuit of Fig. 1 form the contact timing arrangement, connection between the two circuits being effected over leads 10 and 11. The valves $V_{21}$ and $V_{22}$ are pulse amplifiers while the diodes $V_{23}$ and $V_{24}$ are for preventing interference between the S and Z pulses. As previously pointed out with reference to Fig. 1, the normal condition is for $V_1$ to be conducting and for $V_2$ to be non-conducting, and that an S pulse may be a negative-going pulse on lead 10 or a positive-going pulse on lead 11 while a Z pulse may be a positive-going pulse on lead 10 or a negative-going pulse on lead 11.

Assume for the moment that banks TS3 and TS4 of the test select switch are omitted and that the cathodes of $V_{23}$ and $V_{24}$ are directly connected to the control grids of $V_{21}$ and $V_{22}$ respectively. Resistances $R_{21}$, $R_{23}$ and $R_{22}$, $R_{24}$ form two potentiometers between negative battery (250 volts negative) and earth and $R_{23}$ and $R_{24}$ are very much less than $R_{21}$ and $R_{22}$ respectively so that when both diodes are non-conducting both $V_{21}$ and $V_{22}$ are cut-off and the cathode potential of the diodes is negative with respect to earth to the extent almost of the whole negative battery voltage. Hence if earth is applied to either diode anode, say $V_{24}$ the diode will conduct and the potential of the control grid of $V_{22}$ will become less negative. The circuit components are so chosen that the potential of the control grid of $V_{22}$ is brought above the cut-off point, the valve conducts and a negative-going impulse is fed through $C_{22}$ to lead 10. This will constitute an S pulse. A similar negative-going pulse will be fed through $C_{21}$ to lead 11 on the application of earth to the anode of $V_{23}$ and will constitute a Z pulse. Similarly removal of earth from the anode of $V_{24}$ will give rise to a Z pulse and removal of earth from the anode of $V_{23}$ will give rise to an S pulse.

Now consider the operation of the circuit with the test selector TS in the position shown and with the relay coil A connected between terminals 17 and 18 and its break contact A1 connected between terminals 15 and 16. These connections will give the operate time of the break contact. Negative battery is connected to both diode anodes and both are therefore nonconducting. When the start key ST is operated, however, the anodes of both diodes are earthed and a circuit is completed for the relay coil. The earthing of the anode of $V_{24}$ is without effect since no circuit is completed over contact 1 of TS4. The earthing of the anode of $V_{23}$, however, gives rise to a negative-going pulse on lead 10 i. e. an S pulse so that counting is started on the closure of the circuit of the relay. When the relay contact opens, earth is removed from the anode of $V_{23}$ giving rise to a positive-going pulse on lead 10 i. e. a Z pulse. Counting is thus stopped when the contact opens i. e. at the end of operate time of the contact.

The start key ST is a locking key and the indication remains on the decade counters as long as the key is in its operated position, springs (not shown) being included in the circuit of each decade counter and serve on restoration of the key to insert a resistance in the anode supply of the valves which are non-conducting in the zero position. The provision of these springs ensures that the indication is cancelled on the restoration of the key and also that impulses from the impulse source are only effective on the counters while the key is operated.

With the wipers of the test select switch TS in position 2, the operate time of a make contact may be obtained. The operation of the start key ST energises the relay coil and earths the anode of $V_{24}$ thereby giving rise to a negative-going pulse on lead 10 i. e. an S pulse. The closing of the make contact earths the anode of $V_{23}$ thus giving rise to a negative-going pulse on lead 11 i. e. a Z pulse.

In positions 3 and 4 of the test select switch, the relay coil is energised with the start key normal to enable the release times to be obtained, the release of a make contact being obtained in position 3 and the release of a break in position 4. In position 3, a positive S pulse is given on lead 11 and a positive Z pulse is given on lead 10 while in position 4, a positive S pulse and a negative Z pulse are given on lead 11.

The arrangement may also be used to obtain the time taken between the opening of one contact and the closing of a second contact or between the closing of one contact and the opening of a second. The two contacts may be in the form of a changeover spring set in which case the measurement will give the so-called "transit" time of the moving spring. Alternatively the contacts may form part of separate relays. Further an indication may be obtained of the difference in operate or release times of two make or break contacts which may be controlled by the same or different relays. These various measurements are made with the test select switch TS in positions 5, 6, 7 and 8.

Thus with the switch in position 5 the operate or release transit times of a changeover spring set are obtained with the moving spring connected to terminal 16 and the fixed springs both connected to terminal 15 as shown in Fig. 8A. Earth is removed from the terminal 15 to give a positive S pulse on lead 11 on break and is reconnected on make to give a negative Z pulse on lead 11. Alternatively the make spring could be connected to terminal 17 to give the same signals over lead 11 as shown in Fig. 8B. It will be understood that in this operation and also in the operations to be described subsequently, the energisation or deenergisation of the relay coil does not give rise either to an S or a Z pulse and it is preferable that the coil should be energised in an external circuit. Further the operation of the start key is of no effect as regards the circuits shown in Figs. 1 and 7 but it must be operated in order to enable the counters to provide the required indication.

If the two contacts A1 and B1 are controlled by different relays i. e. a break contact of one and a make contact of the other, the time between the opening of one and the closing of the other may be obtained by connecting the contacts as in Fig. 8C. Earth off terminal 15 then gives rise to a positive S pulse on lead 11 and earth on terminal 17 gives rise to a negative Z pulse on lead 11. This presupposes that the break contact opens before the make closes but in general this will not be known when the contacts are connected up. If the make closes before the break opens, no indication will be obtained on the counters. The test select switch is then rotated to position 7 when earth on terminal 17 gives rise to a negative S pulse on lead 10 and earth off terminal 15 gives a positive Z pulse on lead 10. If the make contact had been connected between terminals 15 and 16 (Fig. 8C) and the break between terminals 16 and 17 and the make closed first, no indication would be obtained in position 5 of the test select switch. By changing to position 7 when the connections are as shown in Fig. 8F, the appropriate indication will be obtained. It will thus be seen that it is immaterial as to how the contacts are connected up since if no indication is obtained in one position of the test select switch it is only necessary to rotate the switch to the other position to obtain an indication.

In order to obtain the difference in operate times between two break or two make contacts they are connected up as shown in Figs. 8D and 8E respectively. Assuming in Fig. 8D that A1 breaks first, earth off terminal 15 gives a positive S pulse on lead 11 and earth off terminal 17 gives a positive Z pulse on lead 10. Again in Fig. 8E if A2 makes first, earth on 17 gives a negative S pulse on lead 10 and earth on 15 gives a negative Z pulse on lead 11. If the connection is incorrect i. e. A2 breaks first (Fig. 8D) or A1 makes first (Fig. 8E), the test select switch is rotated to position 8 when as shown in Figs. 8G and 8H, the connections to leads 10 and 11 are reversed.

It will be, of course, understood that if any of the contacts under test have a standing potential thereon arrangements must be made for maintaining the appropriate polarity conditions for the test in question.

For heavy currents or where the component being timed forms part of a working circuit, an external contact can be used to complete the test cycle. On A. C. circuits or where inconvenient potentials are involved, an auxiliary relay can be used. This is first timed independently and the result subtracted from the over-all time obtained when the auxiliary relay is used to control the tested circuit.

The 10 msec. range, measuring to 0.1 msec. is fast enough for most high-speed apparatus. Since each time unit in this range is accurate to approximately 1 to $10^4$, a closer result can be obtained by integrating over a number of operations. Ten tests on a high-speed relay, for example, gave 0.4 msec. three times and 0.5 msec. seven times. Probability indicates an operating time of 0.47 msec. The testing sequence is rapid and the results clearly indicated so that the second decimal place can be obtained quite readily.

When using the 0–100 msec. range, it is possible to achieve three significant figures by switching to the high-speed range as soon as the result is known approximately. Similarly the one second scale can be supplemented by the other two and an accuracy of 0.1 msec. is thus available on all readings. For periods longer than one second, it is a simple matter to add one second for each flash of the last lamp of the tens decade.

The input and output leads of the decades are available and serve a number of useful functions. The range as a straight counter can be increased by connecting one or more instruments in cascade. The 100-1 frequency division is often useful especially as a source of impulse trains. An oscillator is connected to the input terminals and the impulses obtained from a relay in one anode of a "scale-of-two" circuit fed from the output. The instrument forms a reasonable accurate frequency standard, and covers a range, 100, 10 and 1 C./S. that is not generally available.

The circuit shown in Figs. 1 and 7 is capable of very considerable accuracy but for many purposes where a less accurate determination is required, the simpler circuit shown in Fig. 9 may be used. It will be understood that the circuit of Figs. 1 and 7 is essentially a pulse control circuit but that of Fig. 9 operates on a D. C. basis. In Fig. 9 the components which are also shown in Fig. 1 are given the same reference as in Fig. 1.

Referring now to Fig. 9, with the key contacts in the position shown, the two high-speed relays HSA and HSB are both operated and consequently the relay A under test is deenergised and its make contact A1 is open. The values of the resistances $R_{31}$ and $R_{33}$, which form a potentiometer between earth and the negative supply-voltage, are such that the voltage at the junction of $R_{31}$ and $R_{33}$ and hence the voltage on the control grid of $V_3$ is approximately 50 volts negative so that $V_3$ is biased well beyond cut-off.

Assume that it is required to determine the operate time of the make contact A1. Then the locking key controlling the contacts KC1 and KC2 is operated followed by the operation of the non-locking key KT. The operation of KT causes the release of the two high-speed relays HSA and HSB. Relay HSB at HSB1 closes an energising circuit for relay A while relay HSA at HSA1 connects resistance $R_{30}$ to resistance $R_{32}$ over KR3, HSA1 and KC2. The effect of the connection of resistance $R_{30}$ is to make the voltage at the top end of $R_{32}$ and hence the voltage on the grid of $V_3$ more positive than 50 volts negative and by suitably choosing the values of the resistances it is arranged that $V_3$ is now biased just below cut-off so that the positive-going pulses from the anode of $V_4$ raise the grid voltage above cut-off and the pulses pass through $V_3$ and are fed via $C_5$ and lead 13 to the counter.

When contact A1 finally makes, resistances $R_{30}$ and $R_{31}$ are connected in parallel to the junction of $R_{32}$ and $R_{33}$ and $R_{32}$ is short circuited. The negative bias applied to the control grid of $V_3$ now goes more negative to such an extent that the positive-going pulses applied to the grid do not carry the grid above the cut-off voltage. The flow of impulses to the counting arrangement is thereby stopped.

If it is desired to determine the operate time of a break contact, the KC contacts are not operated. Before the operation of the key KT, the condition of the circuit is the same as in the previous case and 50 volts negative is applied to the grid of $V_3$. When the test key KT is operated, $R_{30}$ is again connected to the top end of $R_{32}$ via KR3, HSA1, KC1 and contact A1. The bias on the grid of $V_3$ is again increased to enable the pulses to pass through $V_3$ while when A1 opens, the circuit reverts to its first condition when 50 volts negative is applied to the grid of $V_3$.

For the determination of release times, the locking key controlling the contacts KR1, KR2 and KR3 is operated so that prior to the operation of KT, relays HSA and HSB are unoperated and relay A is thus operated. If the release time of a make contact is required the key controlling the KC contacts is unoperated so that prior to the operation of key KT, $R_{30}$ and $R_{31}$ are connected in parallel to the junction of $R_{32}$ and $R_{33}$ while $R_{32}$ is short-circuited. This condition as has previously been explained causes $V_3$ to be biased beyond cut-off so that no pulses can pass therethrough. When the test key is operated relays HSA and HSB operate and the circuit of relay A is consequently opened. Also at HSA1, the short-circuit is removed from resistance $R_{32}$ and consequently the grid bias of $V_3$ goes positive to such an extent that the pulses are able to pass through the valve. Finally when contact A1 opens, $R_{30}$ is disconnected from the top end of resistance $R_{32}$ and the valve $V_3$ is biased well beyond cut-off to prevent the passage of pulses therethrough.

If the release time of a break contact is required, the KC contacts are operated in addition to the KR contacts so that, prior to the operation of key KT, the condition of the circuit will be as for the make contact, $R_{30}$ being connected to the top end of $R_{32}$ via KR2 and KC2. When the test key is operaed relays HSA and HSB operate and contact HSA1 removes the short circuit from resistance $R_{32}$ and the pulses pass through the valve $V_3$ as before. The closing of contact A1 then replaces the short-circuit and pulses cease to pass through $V_3$.

For the measurement of transit times and difference times it is necessary to employ an external source of voltage. For instance in determining the difference in the make time of two make contacts, the faster of the two contacts, as determined by a preliminary test, is connected to earth through a low resistance $R_L$ while the slower is connected to battery through a further resistance $R_{LA}$ which has a value small compared with $R_L$. The two contacts are then connected in parallel to terminal 20, while no connection is made to terminal 21. The two relay coils will be connected in parallel between terminals 22 and 23. Resistance $R_{30}$ does not enter at all into this test and prior to the operation of KT, the valve $V_3$ is biased well beyond cut-off. The operation of KT causes relay HSB to release and energise the windings of the two relays, while relay HSA is without effect during this test. When the faster contact makes, earth is connected to the upper end of resistance $R_{32}$ over resistance $R_L$. Resistance $R_L$ has a value which is sufficiently less than the combined resistance of $R_{31}$, $R_{32}$ and $R_{33}$ to cause the grid biasing voltage on $V_3$ to approach the cut-off value to enable pulses to pass through $V_3$. When the slower contact makes battery is connected through $R_{LA}$ (which is less than $R_L$) to terminal 20 and $V_3$ is again biased well beyond cut-off. Similarly the difference in operate or release times of break contacts may be determined for contacts of the same or different relays.

The transit time of a changeover springset may also be determined by connecting the two fixed springs together and to battery via a resistance, the moving spring being connected to terminal 20. The KC contacts are also operated so that on the operation of key KT and the release of relay HSA, resistance $R_{30}$ is connected to the top end of $R_{32}$ but owing to the connection of resistance battery to terminal 20 through the break spring of the changeover springset, the valve $V_3$ is biased well beyond cut-off. When the break contacts open however the grid bias becomes more positive and pulses pass through $V_3$ but when the make contacts close, the previous condition again becomes effective and the valve $V_3$ is again biased beyond cut-off.

Other tests such as the "bunching" time of make-before-break contacts may also be made by suitably connecting battery and earth connections to the contacts but sufficient explanation has been given to enable these subsequent tests to be understood. With regard to the values of the components it has been found that satisfactory operation is obtained using a 200 volt source:

$R_{30}=R_{31}=300$ K.
$R_{32}=470$ K.
$R_{33}=1$ M.
$R_{34}=220$ K.

A further example of a timing circuit which is particularly suitable for use with high-speed relays is shown in Fig. 10. This circuit is intended to replace that part of the circuit of Fig. 9 to the left of the dotted line, the lead 40 of Fig. 10 extending to resistance $R_{34}$ of Fig. 9.

The potential existing at the junction of $R_{48}$ and $R_{49}$ determines the bias on the control grid of the gate valve $V_3$ shown in Fig. 9 and the values of $R_{47}$, $R_{48}$ and $R_{49}$ are such that when the valve $V_{43}$ is conducting, the potential at the junction of $R_{48}$ and $R_{49}$ is sufficiently negative to drive the control grid of $V_3$ well beyond cut-off, while when the valve $V_{43}$ is non-conducting, the potential at the junction of $R_{48}$ and $R_{49}$ is such that the control grid of $V_3$ is just below cut-off and the positive-going pulses from the impulse source then pass through the valve $V_3$.

The circuit of Fig. 10 is, therefore, arranged in such a manner that the valve $V_{43}$ is conducting before the test is initiated and the occurrence of the first event, for example the energisation or de-energisation of the relay coil, serves to render $V_{43}$ non-conducting while the second event, for example, the opening or closing of the relay contact, serves to render the valve $V_{43}$ again conducting.

The relay coil is connected between terminals 42 and 43, negative battery being connected to terminal 42 while the contact springs are connected between terminals 44 and 45. The test select switch ITS is then set to the required position according to the test to be made and the non-locking test key IST is then operated. The positions of the test select key for the various tests are as follows:

| Position of test key | Test |
|---|---|
| 1 | Release time of break contact. |
| 2 | Release time of make contact. |
| 3 | Operate time of make contact. |
| 4 | Operate time of break contact. |

Assuming it is required to determine the release time of a break contact, the test select switch will be in position I and the coil of the relay will be energized through ITSI and IST in its normal position. The anode of the diode $V_{40}$ will thus be at earth potential and due to the connection of resistances $R_{40}$ and $R_{41}$, $R_{40}$ being very much greater than resistance $R_{41}$, current will flow through the diode and the potential of the cathode will be substantially earth. This potential is fed over ITS2 to the control grid of $V_{43}$ which will, therefore, conduct and the gate valve $V_3$ will be cut-off. When the test key IST is operated to initiate the test, earth is removed from the diode anode and is replaced by negative battery. The diode ceases to conduct and the potential of the cathode falls to a value of approximately 20 volts negative when the preferred values of the components are used. This is sufficient to cause the valve $V_{43}$ to be cut-off and the consequent change of potential at the junction of $R_{48}$ and $R_{49}$ is such as to raise the potential on the control grid of the gate valve to just below cut-off. When the contact AI closes, the negative voltage on the control grid of $V_{43}$ is replaced by earth through the contacts of ITS3 in position I so that the valve $V_{43}$ again becomes conducting.

The operation of the circuit to determine the release time of a make contact is very similar but in this case the cathode of the diode $V_{40}$ is connected to the control grid of $V_{43}$ through ITS2 and ITS3 and the contacts AI since the contacts will be closed before the test is made whereas in the previous case they were open. When the test key IST is operated, the diode $V_{40}$ ceases to conduct as before and the valve $V_{43}$ is cut-off. When the contacts AI open the negative potential is disconnected from the control grid of $V_{43}$ and the latter valve again conducts.

In order to determine the operate times of a make or break contact, the valve $V_{42}$ is connected in series in the valve $V_{43}$ and acts as a phase reverser of the cathode potential of the diode $V_{40}$. Thus assuming that the operate time of a make contact is to be determined, the relay coil A will be de-energized before the operation of the key IST so that the anode of $V_{40}$ will be negative with respect to the cathode and $V_{40}$ will be non-conducting. The negative potential on the cathode will thus be applied over position 3 of ITS2 to the control grid of valve $V_{42}$ which will thereby be cut-off. The potential at the junction of $R_{43}$ and $R_{44}$ will be applied to the control grid of $V_{43}$ over ITS4 and the values of $R_{43}$ and $R_{44}$ are so selected that this potential is sufficient to cause the valve $V_{43}$ to conduct, thus providing the appropriate initial potential over the lead 40. When the test key IST is operated earth is connected to the anode of $V_{40}$ instead of battery, the diode conducts and consequently causes $V_{42}$ to conduct. The potential at the junction of $R_{43}$ and $R_{44}$ thus goes negative to a sufficient extent to cut-off the valve $V_{43}$. Finally when the contacts AI close, earth is connected over ITS3 and the contacts to the control grid of $V_{43}$ which again conducts.

With the test select switch in position 4, the potential at the junction of $R_{43}$ and $R_{44}$ is fed to the control grid of $V_{43}$ via ITS3 in position 4 and contacts AI, which in this case are closed before the test is made. Hence before the operation of the test key, the valve $V_{42}$ is cut-off and the valve $V_{43}$ is conducting. When the relay coil is energised, the condition of the valves $V_{42}$ and $V_{43}$ are reversed and finally when the contact opens $V_{43}$ is again rendered conducting.

If it is required to determine the difference in operate or release times between two contacts of the same or a different relay, an external source of supply must be used. The relay contacts will be connected in parallel to terminal 43 and the first one to operate, as determined by a preliminary test, will apply earth to the anode of $V_{40}$ while the operation of the second will apply battery to the anode of $V_{40}$, the test select switch ITS being in position I. Any other operating time of relay contacts, for instance the transit time of change-over springs or the "bunching" time of make-before-break contacts, can be timed with this circuit by suitably connecting the contacts to an external source of supply in such a manner that the occurrence of the first event, for example the break of the break springs of a change-over set, will apply earth to the anode of $V_{40}$ while the second event i. e. the make of the make springs of a change-over set, will apply battery to the anode of $V_{40}$. In the case of these tests the test key IST performs no useful function.

In the drawings the reference FE refers to an earth obtained by connection to the frame of the equipment and when using an external source of supply, the frame earth and the battery earth may differ appreciably and upset the accuracy of the circuit. In order to avoid this, the diode $V_{41}$ is inserted as shown and conducts if the frame earth is positive with respect to the battery earth thereby equalising the two earth voltages.

The following component values, using a 200 volt internal supply, have been found to give satisfactory results:

$R_{40}$=2 M.
$R_{41}=R_{43}=R_{45}=R_{48}=R_{49}$=220 K.
$R_{42}=R_{46}=R_{47}$=47 K.
$R_{44}$=330 K.

I claim:

1. An arrangement for timing the contacts of electromagnetic relays comprising in combination terminals to which are connected the winding and contacts of the relay to be timed, a gate circuit, input and output circuits for said gate circuit, a substantially constant frequency source of pulses connected to said input circuit, an electronic counter connected to said output circuit, a source of direct voltage, a variable potentiometer network connected across said source, a connection between a point on said potentiometer network and said input circuit, switching means for initially setting up said potentiometer network and for connecting said relay contact terminals to said potentiometer network in accordance with the particular timing operation to be effected and means for initiating a timing operation whereby the operation of said last-mentioned means provides a gate opening potential to said point for application to said input circuit to enable pulses from said source to pass to said counter while the operation of said relay contacts provides a gate-closing potential to said point for application to said input circuit to present further pulses passing to said counter.

2. An arrangement as claimed in claim 1 and comprising first, second and third resistors, said first and second resistors being connected across said source of direct voltage while said third resistor connects the junction of said first and second resistor to said input circuit, a fourth resistor and key switches for short-circuiting said third resistor in conjunction with the operation of the relay contact and for connecting also in conjunction with the operation of the relay contact said fourth resistor to the end of said third resistor connected to said input circuit.

3. An arrangement as claimed in claim 2 and comprising first, second and third resistors, said first and second resistors being connected across said source of direct voltage while said third resistor connects the junction of said first and second resistor to said input circuit, first and second relay contacts a second source of direct voltage, a fourth resistor connected between one pole of said second source and said first relay contact, a fifth resistor connected between the other pole of said second source and said second relay contact, said relay contacts being connected in parallel to the end of said third resistor connected to said input circuit.

4. An arrangement as claimed in claim 1 and comprising a start key, two high speed relays for responding to the operation of said start key and in responding to control the current flow through the winding of the relay and to produce a gate-opening potential.

5. An arrangement as claimed in claim 4 and comprising a changeover key switch connected between said start key and said high speed relays.

GEORGE THOMAS BAKER.

REFERENCES CITED

The following references are of record in the file of this patent:

UNITED STATES PATENTS

| Number | Name | Date |
|---|---|---|
| 1,561,225 | Fry | Nov. 10, 1925 |
| 1,822,000 | Young | Sept. 8, 1931 |
| 1,844,950 | Finch | Feb. 16, 1932 |
| 2,272,070 | Reeves | Feb. 3, 1942 |
| 2,332,300 | Cook | Oct. 19, 1943 |
| 2,402,989 | Dickinson | July 2, 1946 |
| 2,407,320 | Miller | Sept. 10, 1946 |
| 2,414,479 | Miller | Jan. 21, 1947 |
| 2,418,521 | Morton et al. | Apr. 8, 1947 |
| 2,422,698 | Miller | June 24, 1947 |
| 2,425,063 | Kahn et al. | Aug. 5, 1947 |
| 2,426,454 | Johnson | Aug. 26, 1947 |
| 2,428,990 | Rajchman | Oct. 14, 1947 |
| 2,435,840 | Morton | Feb. 10, 1948 |
| 2,442,403 | Flory et al. | June 1, 1948 |

FOREIGN PATENTS

| Number | Country | Date |
|---|---|---|
| 355,705 | Great Britain | Aug. 24, 1931 |
| 356,111 | Great Britain | Aug. 24, 1931 |

OTHER REFERENCES

Proceedings of the Physical Society of London, vol. 51, 1939, "An Accurate Hard Valve Counter Chronograph," by Uffelmann, pp. 1028–1033.

Electronic Industries, July 1945, "Preset Interval Timer," pp. 97–99, 130, 134, 138, 142, 146.